United States Patent
Kretschmar et al.

(10) Patent No.: US 11,139,900 B2
(45) Date of Patent: Oct. 5, 2021

(54) VEHICLE-TO-X COMMUNICATION SYSTEM

(71) Applicant: Continental Teves AG & Co. oHG, Frankfurt am Main (DE)

(72) Inventors: Sven Kretschmar, Gustavsburg (DE); Marc Menzel, Weimar (Lahn) (DE); Michael Bruechle, Frankfurt am Main (DE); Nils Bauch, Idstein (DE); Torsten Martin, Steinbach/Taunus (DE)

(73) Assignee: Continental Teves AG & Co. oHG

( * ) Notice: Subject to any disclaimer, the term of this patent is extended or adjusted under 35 U.S.C. 154(b) by 55 days.

(21) Appl. No.: 16/603,699

(22) PCT Filed: Apr. 12, 2018

(86) PCT No.: PCT/EP2018/059365
§ 371 (c)(1),
(2) Date: Oct. 8, 2019

(87) PCT Pub. No.: WO2018/189281
PCT Pub. Date: Oct. 18, 2018

(65) Prior Publication Data
US 2021/0099243 A1  Apr. 1, 2021

(30) Foreign Application Priority Data
Apr. 12, 2017  (DE) .................... 10 2017 206 288.6

(51) Int. Cl.
*H04B 17/15* (2015.01)
*H04B 17/19* (2015.01)
(Continued)

(52) U.S. Cl.
CPC ............. *H04B 17/19* (2015.01); *H04B 17/14* (2015.01); *H04W 4/40* (2018.02)

(58) Field of Classification Search
CPC .......... H04B 1/38; H04B 17/14; H04B 17/15; H04B 17/16; H04B 17/19; H04B 17/39;
(Continued)

(56) References Cited

U.S. PATENT DOCUMENTS

| | | |
|---|---|---|
| 8,520,695 B1 | 8/2013 | Rubin et al. |
| 9,379,828 B2 | 6/2016 | Banasky |

(Continued)

FOREIGN PATENT DOCUMENTS

| | | |
|---|---|---|
| DE | 102004018614 A1 | 11/2005 |
| DE | 102008060231 A1 | 6/2009 |

(Continued)

OTHER PUBLICATIONS

Notice of Reasons for Refusal for Japanese Application No. 2019-554551, dated Oct. 28, 2020, with translation, 13 pages.
(Continued)

*Primary Examiner* — Frank Duong
(74) *Attorney, Agent, or Firm* — RatnerPrestia

(57) ABSTRACT

A vehicle-to-X communication system having a vehicle-to-X communication module. The vehicle-to-X communication module continuously carries out self-tests which are based on receiving test messages and evaluating test messages in order to recognize errors.

19 Claims, 2 Drawing Sheets

(51) Int. Cl.
*H04B 17/14* (2015.01)
*H04W 4/40* (2018.01)

(58) Field of Classification Search
CPC .......... H04L 12/26; H04L 43/08; H04W 4/40; H04W 24/00; H04W 24/04; H04W 24/06; H04W 24/08; H04W 52/38
See application file for complete search history.

(56) References Cited

U.S. PATENT DOCUMENTS

| | | | | |
|---|---|---|---|---|
| 9,515,751 | B2* | 12/2016 | Hammes | ................ H04B 17/29 |
| 9,566,966 | B2* | 2/2017 | Erdem | ...................... H04L 1/20 |
| 9,823,166 | B2* | 11/2017 | Dudar | .................. G07C 5/0808 |
| 10,355,793 | B2* | 7/2019 | Naseef | ................... G08G 1/161 |
| 2005/0259589 | A1 | 11/2005 | Rozmovits et al. | |
| 2007/0136046 | A1 | 6/2007 | Liu | |
| 2008/0313344 | A1 | 12/2008 | Joung et al. | |
| 2010/0093282 | A1 | 4/2010 | Martikkala et al. | |
| 2010/0303048 | A1 | 12/2010 | Stählin et al. | |
| 2012/0257656 | A1 | 10/2012 | Kang et al. | |
| 2015/0146605 | A1* | 5/2015 | Rubin | .................... G08G 1/161 370/312 |
| 2015/0381228 | A1 | 12/2015 | Milenkovic | |
| 2016/0049995 | A1 | 2/2016 | André et al. | |
| 2016/0134383 | A1 | 5/2016 | Banasky, Jr. | |

FOREIGN PATENT DOCUMENTS

| | | |
|---|---|---|
| JP | 2000041027 A | 2/2000 |
| JP | 2000311260 A | 11/2000 |
| JP | 2016184867 A | 10/2016 |
| KR | 20120114136 A | 10/2012 |
| WO | 2014148958 A1 | 9/2014 |

OTHER PUBLICATIONS

International Search Report and Written Opinion for International Application No. PCT/EP2018/059365, dated Jul. 13, 2018—10 pages.
Chinese Office Action for Chinese Application No. 201880024376.2, dated May 24, 2021, with translation, 12 pages.
European Examnation Report for European Application No. 18717598.9, dated Aug. 2, 2021 with translation, 12 pages. 2021.

* cited by examiner

VEHICLE-TO-X COMMUNICATION SYSTEM

CROSS REFERENCE TO RELATED APPLICATIONS

This application is the U.S. National Phase Application of PCT International Application No. PCT/EP2018/059365, filed Apr. 12, 2018, which claims priority to German Patent Application No. 10 2017 206 288.6, filed Apr. 12, 2017, the contents of such applications being incorporated by reference herein.

FIELD OF THE INVENTION

The invention relates to a vehicle-to-X communication system having a vehicle-to-X communication module.

BACKGROUND OF THE INVENTION

Vehicle-to-X communication modules, also referred to as Electronic Control Units (ECUs), are known in the prior art. These comply, for example, with the standards of ETSI, SAE, IEEE or other standardization organizations. For example, these vehicle-to-X communication modules can be operated with a frequency of 5.9 GHz (in particular in Europe) or with a frequency of 760 MHz (in particular in Japan).

In particular, it can also be provided that such vehicle-to-X communication modules carry out self-tests of the CPU, memory, bus systems, sensors and/or actuators. However, it has been shown that the vehicle-to-X communication modules known in the prior art, which are typically part of vehicle-to-X communication systems in vehicles, only have an inadequate ability to discover system errors.

As a rule, the current standards only define control operation and do not define how errors can be detected and how to react to them. This is insufficient if the aim is to exchange more than just uncritical information with vehicle-to-X communication, since failures are always to be expected in the difficult environmental conditions of a motor vehicle. If such failures go undetected, neither the vehicle-to-X communication module itself nor the driver has an opportunity to react to them and the vehicle, with its occupants, can consequently find itself in hazardous situations. This is only permitted with a very small probability, for example, for functions having ASIL classification>QM in accordance with ISO26262.

SUMMARY OF THE INVENTION

Therefore, an aspect of the invention aims to provide a vehicle-to-X communication system having a vehicle-to-X communication module with improved error recognition.

An aspect of the invention relates to a vehicle-to-X communication system having a vehicle-to-X communication module.

It is provided according to an aspect of the invention that the vehicle-to-X communication module is configured to carry out self-tests continuously, on request or at defined times, wherein each self-test comprises at least the following steps:
  receiving a test message, and
  evaluating the test message in order to recognize errors.

It is possible to recognize errors on the basis of received test messages by means of the vehicle-to-X communication system according to an aspect of the invention. As a result, not only can a respective self-test of the components already mentioned above be carried out, but far more components of a vehicle-to-X communication system can be tested and far more different error sources can be identified.

Continuously carrying out self-tests can, for example, mean carrying out self-tests at predetermined or variable intervals of time. For example, a defined time can be a system startup. A request can, for example, come from another unit, for example via the vehicle's on-board electrical system.

The steps mentioned can in particular be regarded as a method according to an aspect of the invention. This can be supplemented, restricted or extended by all of the features described herein.

According to an embodiment, the vehicle-to-X communication system has a first antenna and a second antenna which are connected to the vehicle-to-X communication module. The vehicle-to-X communication module is configured to emit the test message by means of the first antenna and to receive it by means of the second antenna.

As a result, extensive coverage of the complete transmit and receive paths can be achieved. For example, errors in a radio chip, in an ECU HF amplifier, in a HF switch, in plugs, cables and antennas can be identified in this way.

The vehicle-to-X communication module can also be configured to alternate the first antenna and the second antenna during a part of the self-tests. This can in particular mean that both antennas are alternately used for transmitting or receiving. Consequently, even more error sources can be identified.

According to an embodiment, the vehicle-to-X communication system has an antenna or only one antenna which is connected to the vehicle-to-X communication module and has a feedback path assigned to the antenna. The vehicle-to-X communication module is configured to emit the test message by means of the antenna and to receive it again following its passage through the feedback path. As a result, errors can be established in at least a part of the receive path or transmit path.

The feedback path can in particular be connected between a front-end unit of the vehicle-to-X communication module and the antenna or a base of the antenna, in particular in order to scan the test message. The feedback path can in particular be connected to or after an output of a front-end unit of the vehicle-to-X communication module, in particular in order to scan the test message. The output can in particular be an output for connecting an antenna. The front-end unit of the vehicle-to-X communication module can in particular have a filter on the output side, in particular a band-pass filter, to which the output of the front-end unit can, for example, be immediately connected. The feedback path can in particular be designed to scan the test message prior to it being broadcast via the antenna.

A front-end unit can in particular denote a unit within the vehicle-to-X communication module, which has an amplifier and filter.

The feedback path can in particular be connected to a base of the antenna, to an output of the vehicle-to-X communication module, in front of a high-frequency amplifier and/or to a radio chip. By means of the internal feedback path, it is possible to simultaneously transmit on an output and receive at an input. The position of the feedback path decides on the test coverage.

In the case of a position at the base, the signal can be split, for example due to a weak coupling of a second HF line which is routed close to the signal line, and this small portion can be fed back to the receiver. A further cable can be used for the feedback, or the feedback signal is delayed so considerably, for example by the filter, that it can be conducted onto the same cable. The advantage of this position is that, with the exception of the antenna, the entire system is tested again.

In the case of a position at the ECU output, the signal is split and fed back, as in the case of the embodiment described previously, wherein the feedback signal can be conducted directly into the receiver. In this case, only the ECU components, excluding the plugs and cables, are tested.

In the case of a position in front of the HF amplifiers or in front of a HF amplifier, the signal is split and fed back, as in the case of the position at the base, wherein the feedback signal can be conducted directly into the receiver. It is advantageous that the signal is still weak and can be conducted without strong attenuation into the receive input of the radio chip. However, in this case, typically only the radio chip is tested.

In the case of a position in the radio chip, feedback paths are integrated. The advantage of this is the inexpensive implementation. Only parts of the radio chip can thus be tested.

The same method or the same procedure as described above with reference to two antennas can in principle be used as the test procedure.

Emitted test messages can be wholly or partially operational vehicle-to-X messages. With these, a corresponding test by means of the procedure described herein can be executed, for example, in parallel with the emission which is standard for the system, which is directed at other vehicles or infrastructure components. The emitted test messages can also be messages which are emitted again, which have therefore already been emitted once during the operations of the vehicle-to-X communication module.

According to an embodiment, emitted test messages are wholly or partially dedicated test messages which can be distinguished from operational vehicle-to-X messages. The advantage of these in particular is that they can be optimized especially for test operation. Operational messages are in particular those which are used in normal operation, meaning outside of test operation, in vehicle-to-X communication.

The dedicated test messages can, for example, be identified as such by a special message format, in particular a modified ether-type or modified BTP port, or by special security certificates. Consequently, it is immediately clear to all of the vehicle-to-X subscribers receiving the dedicated test messages that these are test messages which are not relevant to the operations of the vehicle-to-X communication and which do not contain any messages to be processed.

According to an embodiment, the dedicated test messages are not emitted if a channel load exceeds a threshold. Consequently, it can be prevented that messages, which do not contain any information but which block acutely important messages, are emitted due to a test operation. Rather, the dedicated test messages are preferably only emitted if a lower channel load is present, which is therefore, for example, below the threshold. Consequently, times of low channel load can be used for testing, wherein the vehicle-to-X communication is not at all or only slightly adversely affected.

The test messages can preferably be emitted by means of reduced transmission power and/or by means of an attenuator. As a result, the receipt of these in the receiver can be facilitated since an overload is avoided.

According to an embodiment, at least some of the emitted test messages are dedicated erroneous test messages. These can deviate from operational vehicle-to-X messages, for example due to an incorrect MAC (Media Access Control), incorrect CRC (Cyclic Redundancy Check), incorrect modulation, incorrect data rate, too high or too low a transmission power and/or due to incorrect security signing. During evaluation, it is in particular established whether the erroneousness is recognized.

Messages which should not occur during trouble-free operation of a vehicle-to-X communication system can deliberately be used by such dedicated erroneous test messages. It can be established during the evaluation whether the erroneousness of these messages is recognized. As a result, a negative test can be carried out, i.e. it can be established whether the implemented error recognition routines actually recognize errors as well. Such negative tests can be carried out at all levels.

The vehicle-to-X communication module can in particular compare the emitted test message with the received test message during evaluation. Errors can in particular be recognized depending on whether and/or to what extent the emitted test message corresponds to the received test message.

Ideally, the emitted test messages should correspond to the received test messages. If there are deviations from these, this indicates errors. Therefore, the possible error sources are also preferably inferred on the basis of such discovered errors.

According to an embodiment, the test message is a message from another transmitter, in particular from a WLAN transmitter, a mobile radio transmitter or a toll system. A satellite can also be considered as another transmitter. In particular, the test message is not a vehicle-to-X message and/or was not emitted by a vehicle-to-X communication system. In particular, the other transmitter is therefore not a vehicle-to-X communication system.

As a result, recourse can be had, for example, to the fact that a vehicle-to-X communication module also receives signals from WLAN transmitters operating at neighboring frequencies, for example at 5.8 GHz, in its HF path. If such a system is operating in the vehicle, for example a WLAN transmitter for supplying WLAN-enabled devices in the vehicle, this system can notify the vehicle-to-X communication module via a bus inside the vehicle or otherwise what it has just transmitted and when. The vehicle-to-X communication module can compare this information with what it has just received. If the vehicle-to-X communication module is unable to decode the signals, it can at least check HF parameters, for example whether different transmission powers of the WLAN lead to different noise levels in the vehicle-to-X communication module. It is therefore at least possible to draw a conclusion regarding the function of the antenna, plugs, cables and LNA. It is possible to carry out a similar process, for example, with some LTE implementations or other mobile radio systems. In addition, the European 5.8 GHz toll system or another toll system can be used, wherein the toll stations typically always only transmit, but at a defined level. This implementation is particularly helpful since a vehicle-to-X communication module typically knows the position of toll stations and consequently does not require any additional information from externally.

Messages which were not originally intended at all for vehicle-to-X communication can also therefore be used to test a vehicle-to-X communication module.

According to an embodiment, the test message is produced in the vehicle-to-X communication module and, without being emitted, is only conducted within the vehicle-to-X communication module via different layers, and received again by conducting to a specified layer.

Recourse is thereby had to the fact that the communication processing or message processing in a vehicle-to-X communication module is typically organized in so-called layers, similar to the ISO OSI model. As with the tests or HF tests described above, feedback loops can be integrated into the message processing. For example, an output of a Network/Facility or Application Layer can therefore be processed again directly as an input. To this end, these messages are preferably identified as test messages so that they are not passed on to the MAC layer (Media Access Control Layer), which would mean that they are emitted. The internal data structures are preferably extended by a test message identifier. A test message can in particular be provided with an identification which prevents forwarding of the test message to a MAC layer. The test message can in particular already be provided with this identification when it is produced.

An important task of such internal tests is to check the processing time of a message. The correctness of the software can be guaranteed by the relevant software development processes. However, the processing time depends on the general system status and the processing load. Here, errors can be induced from externally. For example, security attacks (denial of service attacks, etc.) can also be recognized. In addition, it can also be checked how long it takes to transmit a message from one layer to the next.

For example, during evaluating of the test message, the processing time, received field strength, MAC, CRC, receive channel and/or type of modulation can subsequently be checked to establish whether they correspond to predefined transmission parameters. During evaluating of the test message, a received field strength and/or a processing time can, for example, also be subsequently checked to establish whether they/it lie(s) within an expected range of values.

On the basis of deviations during the above-mentioned tests, typical errors and, if applicable, also the respective error source or a plurality of possible error sources can in particular be inferred.

When using two antennas, it is not possible, in particular for individual messages, to transmit on both antennas, but only on one, wherein the other antenna receives the signal. The received signal can then in particular be processed in the same way as an ordinary message and can be compared with the emitted message. Data such as the processing time, received field strength, MAC CRC, receive channel or type of modulation can additionally be checked to establish whether they correspond to the transmission parameters. In the case of the received field strength and the processing time, it can in particular be checked whether they lie within an expected range of values. If this test fails several times, it can be assumed that there is an error in the HF circuit or in the radio chip. Individual errors can always occur due to environmental influences. The transmitting and receiving antenna should preferably alternate, in order to test both transmit-receive paths. This test may typically only be carried out sporadically during operations so as not to adversely affect operation, as both antennas are required for full spatial coverage.

In addition to the operational messages, special test messages can be transmitted, and a method described herein or the procedure described herein can only be used for these. The advantage of this is that the operations are not disturbed, but require additional bandwidth for the test operation. In high-load situations, for example if there are too many messages "in the air", the test operation is preferably dispensed with. The test messages can be identified by means of a special message format (e.g. modified ether-type or modified Basic Transport Protocol (BTP) port) or by special security certificates. However, the test can also be carried out with unmodified messages which are emitted again. The advantage of special test messages is that these offer greater freedom in terms of length and content and can thus better provoke errors.

It can be advantageous for all of the methods and procedures described herein if the test messages are sent with a particularly low transmission power or, alternatively, if an additional attenuator is connected in front of the receiver in order, on the one hand, not to overload the HF amplifiers (LNAs) and, on the other hand, to carry out the test in a signal level range which is typical of vehicle-to-X signals.

In addition to positive tests in which the results meet the expectations, negative tests are also to be carried out, in which erroneous messages are deliberately emitted (for example, incorrect MAC parameters, incorrect CRC, incorrect modulation, incorrect data rate, too high or too low a transmission power, erroneous security signing, etc.). These errors are also to be recognized by the test evaluation, otherwise the test evaluation or the test performance is defective.

The described tests can in particular cover the complete transmit and receive paths, including for example radio chip, ECU HF amplifier, HF switch, plug, cable and antennas.

It should be mentioned that the methods or procedures or implementations, which are described herein with reference to only one antenna, can in each case also be used for both antenna paths.

The methods, tests and procedures described herein can in particular also be combined with the standard self-tests of the CPU, memories and peripherals already known from the prior art. However, these will not be discussed in greater detail here since they are the prior art.

BRIEF DESCRIPTION OF THE DRAWINGS

The person skilled in the art will infer further features and advantages from the embodiment examples described below with reference to the appended drawing, in which.

DETAILED DESCRIPTION OF THE PREFERRED EMBODIMENTS

Figure 1:
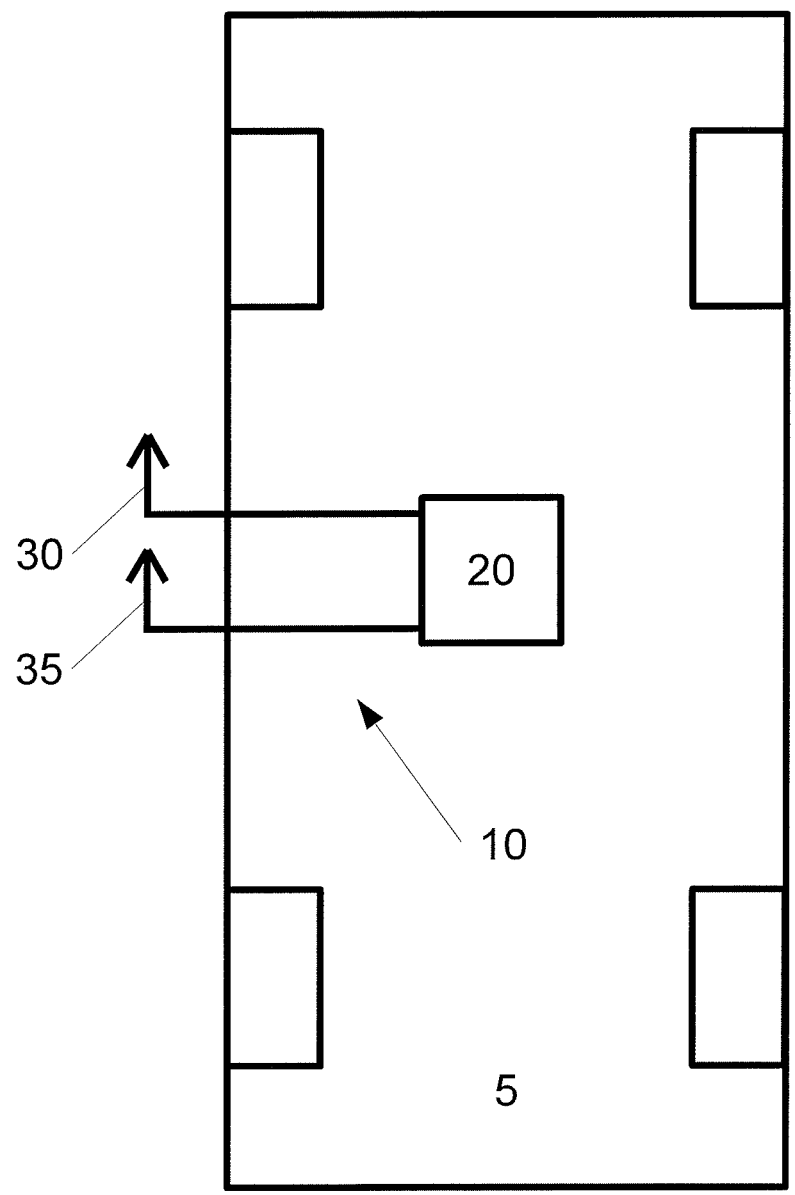
FIG. 1: shows a vehicle having a vehicle-to-X communication system according to a first embodiment example.

FIG. 1 schematically shows a vehicle 5. Therein, a vehicle-to-X communication system 10 according to a first embodiment example of the invention is installed.

The vehicle-to-X communication system 10 has a vehicle-to-X communication module 20. In addition, it has a first antenna 30 and a second antenna 35. The two antennas 30, 35 are connected to the vehicle-to-X communication module 20 as shown.

The vehicle-to-X communication module 20 is designed in the usual way to participate in vehicle-to-X communication according to the usual standards. The vehicle-to-X communication module 20 is additionally designed to carry out self-tests in the manner according to an aspect of the invention.

To this end, test messages are emitted via one of the two antennas 30, 35 and immediately received again via the other of the two antennas 30, 35. The functionality of the two antennas 30, 35 can therefore be alternated such that signal transfers are checked in both directions. A received message in each case can be compared with the message transmitted in each case. For example, parameters such as transmission power, message content, received field strength, MAC, CRC, receive channel or type of modulation can subsequently be checked to establish whether they correspond to predefined transmission parameters. In addition, the received field strength and/or processing time can subsequently be checked to establish whether they/it lie(s) within an expected range of values. In the case of deviations, in particular in the case of deviations over a plurality of messages, a malfunction can be inferred, and an optical and/or acoustic error message or other error message can be displayed, for example, to a driver of the vehicle 5. Information about the error can also be stored and/or such information can be transmitted directly to a central service point, for example to a manufacturer of the vehicle 5 or to a backend of the vehicle-to-X communication. As a result, it is possible to react to the errors immediately and dangerous situations for the vehicle 5, the occupants thereof and/or other road users can be avoided.

Figure 2:
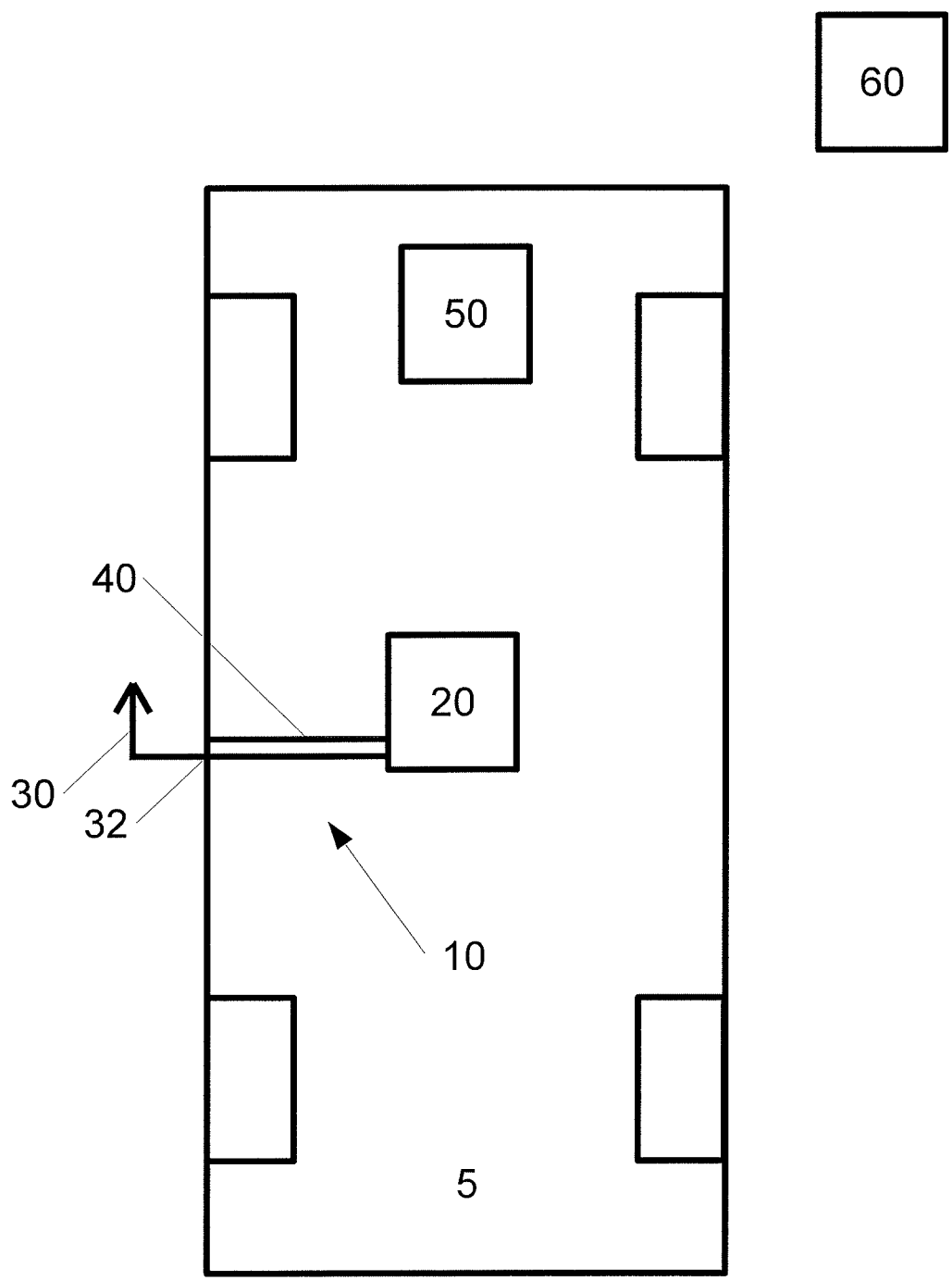
FIG. 2: shows a vehicle having a vehicle-to-X communication system according to a second embodiment example.

FIG. 2 shows a vehicle 5 having a vehicle-to-X communication system 10 according to a second embodiment example of the invention. This is altered, compared with the first embodiment example, in that it only has one antenna 30. Instead of the second antenna 35, it has a feedback path 40 which extends from a base 32 of the antenna 30 back to the vehicle-to-X communication module 20. As a result, emitted signals can be decoupled to a small part and conducted back again to the vehicle-to-X communication module 20. An evaluation can be effected in the same way as described above with reference to FIG. 1.

Normal operational vehicle-to-X messages can, for example, be used for testing in all of the embodiment examples, or dedicated test messages can be used. The latter can be identified in order to be able to distinguish them from operational vehicle-to-X messages. Erroneous or dedicated erroneous test messages can also be deliberately emitted, which deviate from normal vehicle-to-X messages by means of deliberately integrated errors. As a result, negative tests can be carried out, i.e. it can be recognized whether the error recognition is working properly. In the event that such a negative test fails, a malfunction of the error recognition can be inferred and appropriate measures such as, for example, the reactions indicated above to a recognized error can be initiated. In addition, information can be stored, which allows error recognition routines to be optimized.

Furthermore, it can also be seen in FIG. 2 that a schematically represented WLAN transmitter 50 is located in the vehicle 5. This is typically used to supply internet access or other information to entertainment electronics devices which are used by the occupants of the vehicle 5. Since it is known which signals are being emitted by the WLAN transmitter 50, these signals can also be used to test the vehicle-to-X communication system 10. To this end, these can be received via the antenna 30, which therefore functions particularly well because typical WLAN frequencies are very close to typical frequencies of the vehicle-to-X communication.

The WLAN transmitter 50 can in particular transmit information via a bus inside the vehicle to the vehicle-to-X communication module 20, wherein this information displays what the WLAN transmitter 50 has emitted. The vehicle-to-X communication module 20 can use this information in order to check whether errors have occurred or not in the received signals.

Furthermore, a toll system 60 is schematically represented in FIG. 2. This can, for example, be one of the typical toll systems operated in Europe, which have a plurality of road bridges having corresponding transmitters which emit signals in a defined way. These signals can also be received by means of the antenna 30 and can be evaluated by the vehicle-to-X communication module 20. The vehicle-to-X communication module 20 has specific information about the content of these emissions and can consequently compare the received signals with expected signals from a toll system. In the event of deviations, errors can be inferred.

It should be mentioned that the described emissions of test messages can in particular be carried out when a channel load of the vehicle-to-X communication is below a threshold at a given moment. The possibility of the operations of the vehicle-to-X communication being adversely affected by the test operation can thus be avoided.

It should be pointed out in general that vehicle-to-X communication means, in particular, a direct communication between vehicles and/or between vehicles and infrastructure facilities. For example, therefore, vehicle-to-vehicle communication or vehicle-to-infrastructure communication may be involved. Where communication between vehicles is referred to within the framework of this application, this can essentially, for example, take place within the framework of vehicle-to-vehicle communication, which typically takes place without the intermediary of a mobile network or a similar external infrastructure and which can therefore be distinguished from other solutions which, for example, are based on a mobile network. For example, vehicle-to-X communication can take place using the standards IEEE 802.11p and IEEE 1609 or ETSI ITS. Vehicle-to-X communication can also be referred to as C2X communication. The sub-areas can be referred to as C2C (Car-to-Car) or C2I (Car-to-Infrastructure). An aspect of the invention expressly does not, however, exclude vehicle-to-X communication with the intermediary of, for example, a mobile network.

The claims which form part of the application do not constitute a waiver of the attainment of more extensive protection.

If in the course of the proceedings it transpires that a feature or a group of features is not absolutely necessary, then the applicant here and now seeks a wording of at least one independent claim, no longer comprising the feature or the group of features. This may, for example, involve a sub-combination of a claim existing as at the application date or a sub-combination of a claim existing as at the application date restricted by further features. Such claims or combinations of features, which are to be newly worded, are understood to also be covered by the disclosure of this application.

It is further pointed out that configurations, features and variants of aspects of the invention, which are described in the various embodiments or embodiment examples and/or shown in the figures, can be combined with one another as desired. Individual or multiple features are interchangeable as desired. Resulting combinations of features are understood to also be covered by the disclosure of this application.

Back references in dependent claims should not be construed as a waiver of the right to independent, objective protection for the features of the subclaims referred back to. These features can also be used in any combination with other features.

Features which are only disclosed in the description or features which are disclosed in the description or a claim only in conjunction with other features can, in principle, be of independent inventive relevance. They can therefore also be included separately in claims to distinguish from the prior art.

The invention claimed is:

1. A vehicle-to-X communication system including:
   a vehicle-to-X communication module;
   a first antenna connected to the vehicle-to-X communication module; and
   a second antenna connected to the vehicle-to-X communication module,
   wherein the vehicle-to-X communication module is configured to carry out self-tests continuously, on request, or at defined times, by:
      transmitting a first test message from the first antenna,
      receiving the transmitted first test message via the second antenna,
      evaluating the first test message received via the second antenna to recognize errors,
      transmitting a second test message from the second antenna,
      receiving the transmitted second test message via the first antenna, and
      evaluating the second test message received via the first antenna to recognize errors.

2. The vehicle-to-X communication system according to claim 1, wherein
   during evaluating of the test message, the processing time, received field strength, MAC CRC, receive channel and/or type of modulation are subsequently checked to establish whether they correspond to predefined transmission parameters, and/or
   during evaluating of the test message, the received field strength and/or processing time are subsequently checked to establish whether they/it lie(s) within an expected range of values.

3. The vehicle-to-X communication system according to claim 1, wherein
   the vehicle-to-X communication module is configured to alternate the first antenna and the second antenna during a part of the self-tests.

4. The vehicle-to-X communication system according to claim 1,
   wherein the vehicle-to-X communication system has an antenna which is connected to the vehicle-to-X communication module and a feedback path assigned to the antenna, and
   the vehicle-to-X communication module is configured to emit the test message by the antenna and to receive it again following its passage through the feedback path.

5. The vehicle-to-X communication system according to claim 4, wherein
   the feedback path is connected between a front-end unit of the vehicle-to-X communication module and the antenna or a base of the antenna.

6. The vehicle-to-X communication system according to claim 4, wherein
   the feedback path is connected to or after an output of a front-end unit of the vehicle-to-X communication module.

7. The vehicle-to-X communication system according to claim 4, wherein
   the feedback path is connected to a base of the antenna, to an output of the vehicle-to-X communication module, in front of a high-frequency amplifier and/or in a radio chip.

8. The vehicle-to-X communication system according to claim 1, wherein
   emitted test messages are wholly or partially operational vehicle-to-X messages.

9. The vehicle-to-X communication system according to claim 1, wherein
   emitted test messages are wholly or partially dedicated test messages which are distinguishable from operational vehicle-to-X messages.

10. The vehicle-to-X communication system according to claim 9, wherein
    the dedicated test messages are identified by a special message format.

11. The vehicle-to-X communication system according to claim 9, wherein
    the dedicated test messages are not emitted if a channel load exceeds a threshold.

12. The vehicle-to-X communication system according to claim 1, wherein
    the test messages are emitted with a reduced transmission power and/or by an attenuator.

13. The vehicle-to-X communication system according to claim 1, wherein
    at least some of the emitted test messages are dedicated erroneous test messages which deviate due to an incorrect MAC, incorrect CRC, incorrect modulation, incorrect data rate, too high or too low a transmission power and/or incorrect security signing of operational vehicle-to-X messages,
    wherein it is established during evaluating whether the erroneousness is recognized.

14. The vehicle-to-X communication system according to claim 1, wherein
    the vehicle-to-X communication module compares the emitted test message with the received test message during evaluating,
    wherein errors are recognized depending on whether and/or to what extent the emitted test message corresponds to the received test message.

15. The vehicle-to-X communication system according to claim 1, wherein
    the test message is a message from another transmitter, selected from the group consisting of a WLAN transmitter, a mobile radio transmitter or a toll system.

16. The vehicle-to-X communication system according to claim 15, wherein
    the test message is not a vehicle-to-X message and/or was not emitted by a vehicle-to-X communication system.

17. The vehicle-to-X communication system according to claim 1, wherein
    the test message is produced in the vehicle-to-X communication module and, without being emitted, is only conducted within the vehicle-to-X communication module via different layers and is received again by conducting to a specified layer.

18. The vehicle-to-X communication module according to claim 17, wherein
    the test message is provided with an identification which prevents forwarding of the test message to a MAC layer.

19. The vehicle-to-X communication system according to claim 10, wherein the special message format is selected from the group consisting of a modified ethertype port, a modified BTP port, and special security certificates.

* * * * *